Dec. 29, 1964

H. M. DIECKAMP 3,163,843

LIQUID LEVEL INDICATOR

Filed Oct. 2, 1961

INVENTOR.
HERMAN M. DIECKAMP
BY
Gerald G. Korn
ATTORNEY

United States Patent Office 3,163,843
Patented Dec. 29, 1964

3,163,843
LIQUID LEVEL INDICATOR
Herman M. Dieckamp, Canoga Park, Calif., assignor to North American Aviation, Inc.
Filed Oct. 2, 1961, Ser. No. 142,321
2 Claims. (Cl. 340—1)

This invention relates to means for automatically indicating the liquid level in a vessel and more particularly to an electric apparatus for effecting such measurement.

When measuring the level of corrosive or radio-active liquids, or liquids operating at high temperatures, remote measurement is necessary. In nuclear systems and in other industrial applications, space considerations require that level-measuring equipment remain external to the vessel. Also, economies can be achieved and maintenance problems reduced by minimizing the number of mechanical or electrical components operating within the vessel containing the liquid.

It is, therefore, an object of this invention to provide electronic means for automatically and remotely measuring the level of a liquid in a vessel.

Another object of this invention is to provide a liquid level detection system having substantially all electronic circuitry located external to the vessel and requiring no mechanical moving parts within the vessel.

These and other objects of the present invention will be more apparent from the following description and claims taken in conjunction with the accompanying drawings, made a part hereof, in which:

In accordance with this invention, the level of a liquid is measured automatically and remotely by transmitting mechanical vibrations through a rigid member which extends substantially throughout the depth of the liquid and detecting the relative positions of vibrations reflected both from the surface of such liquid and the submersed end of the member. The vibrations are intermittently induced into the member from a reversible energy conversion device actuated by an ultrasonic voltage signal, received from a source external to the vessel. The conversion device also transmutes the reflected vibrations to electrical pulses. Electronic means is provided for measuring the liquid depth by comparing the relative positions of the waveforms of the voltage signal and reflected pulses.

Figure 1:
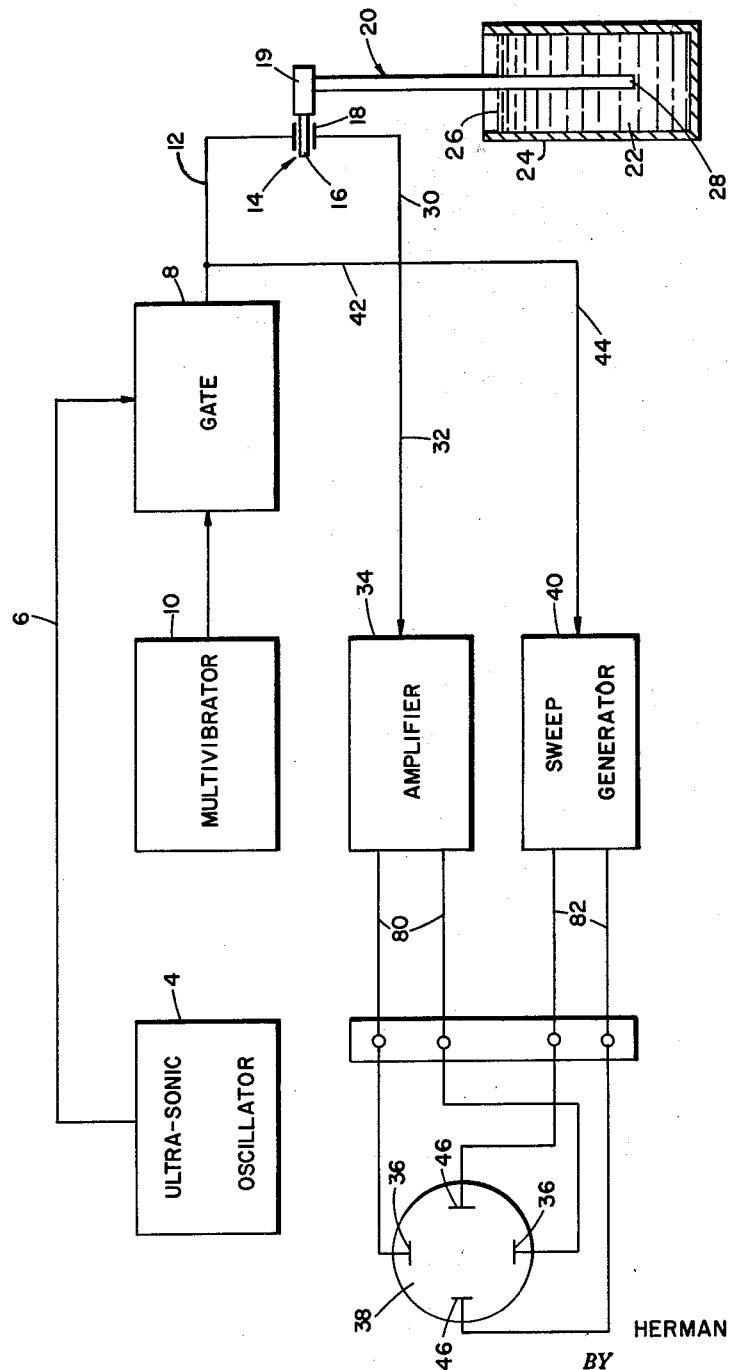
FIG. 1 is a simplified schematic diagram showing the preferred embodiment of this invention in block form.

Referring to the drawings, the preferred embodiment of the present invention is illustrated and will be hereinafter described. In FIG. 1, operation of the system is initiated by a low-power ultrasonic oscillator 4 generating a sinusoidal voltage signal in the 100 kilocycle to 10 megacycle frequency range. The oscillator output is fed through conductor 6 to a gate circuit 8 which functions as an electronic switch, intermittently passing the operating signal through at a predetermined period and repetition rate. The operating signal from oscillator 4 is blocked in gate 8, since this circuit requires two concurrent input signals to produce an output signal. Multivibrator 10 provides the additional input signal, hereinafter referred to as the control signal, which "triggers" gate 8 at a fixed rate, thereby regulating the passage of the operating signal to the output of the gating circuit.

The operating signal from gate 8 is applied through conductor 12 to electro-mechanical transducer 14. Transducer 14 preferably employs a piezoelectric quartz crystal 16 positioned between plane-parallel electrodes 18 which contact one pair of crystal faces. The operating signal is received at electrodes 18 and the crystal becomes energized, thus producing a mechanical stress and displacement on a second pair of crystal faces. In this manner, the operating signal is converted to mechanical vibrations at the same ultrasonic frequency.

The mechanical vibrations of transducer 14 are transmitted through a suitable mechanical coupling 19 to an end of probe 20 and propagated axially through the probe, as transverse pulses. Probe 20 extends substantially throughout the depth of liquid 22 in container 24, one end protruding above the liquid for coupling to transducer 14. As the pulse travels along probe 20, there is an abrupt change in probe impedance and a concomitant variation in pulse transmission characteristic at the liquid surface 26, and at the end 28 of probe 20. This change in impedance produces reflected transverse pulses at the liquid surface 26 and at the submerged end 28 of probe 20, which are smaller in amplitude than the applied pulse. These reflected transverse pulses are propagated back to transducer 14 where they are converted to electrical pulses at the original ultrasonic frequency. Both reflected pulses are next fed through conductors 30 and 32 to amplifier 34 for amplification, and then to the vertical deflection plates 36 of oscilloscope 38.

In addition to being connected to transducer 14, the output of gate 8 is connected to the inputs of amplifier 34 and sweep generator 40. Therefore, when the operating signal is initially fed to transducer 14, it is simultaneously applied through conductors 42, 32 and 44 to the inputs of sweep generator 40 and amplifier 34. It is amplified and then fed to oscilloscope 38. In response to the operating signal, sweep generator 40 produces a saw tooth voltage which energizes the horizontal deflection plates 46 in oscilloscope 38, thereby providing a linear time base therein. Thus, the circuit is synchronized to display on oscilloscope 38 the wave forms of the operating signal and the reflected pulses from the liquid surface 26 and the submerged end 28 of probe 20. Oscilloscope 38 is suitably calibrated to measure the depth of liquid 22 as a function of the relative positions of these wave forms on its screen.

Figure 2:
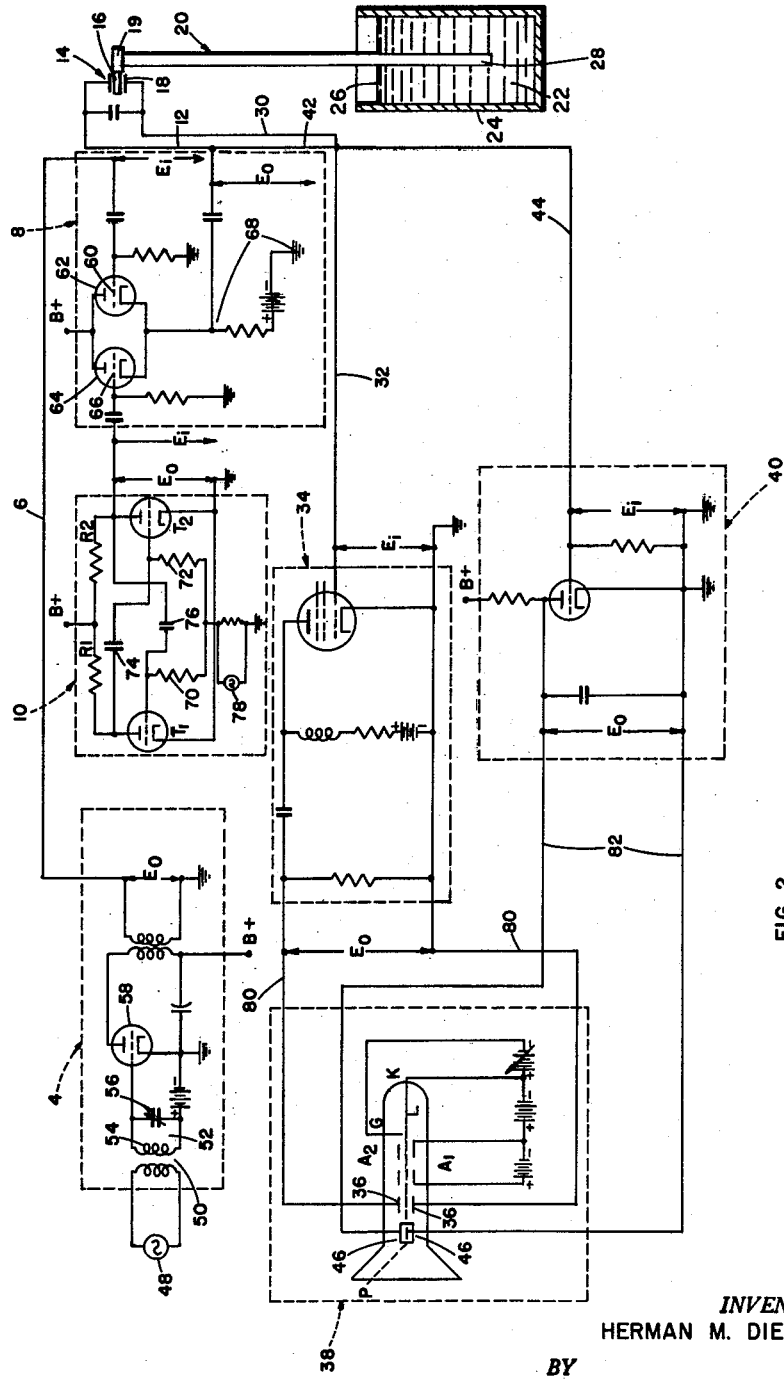
FIG. 2 is a schematic circuit diagram constructed in accordance with the teachings of this invention.

A more detailed understanding of this invention can be had by now turning to the schematic diagram of FIG. 2. Ultrasonic oscillator 4 is a low-power, tuned-grid type and, as mentioned hereinbefore, produces a voltage signal which initiates operation of the system. Current to operate oscillator 4 is supplied from alternating current source 48, which is coupled through transformer 50 to resonant circuit 52. The magnitudes of inductance coil 54 and variable capacitance 56 are selected to provide a one megacycle sinusoidal voltage signal which is fed to the grid of triode 58, wherein it undergoes amplification. The operating signal is then fed through conductor 6 to input grid 60 of triode 62 in gate 8.

Gate 8 intermittently applies the operating signal to transducer 14 at a fixed repetition rate, which is regulated by a control signal received from multivibrator 10. Although a conventional cathode-coupled gate is preferred and used in the present embodiment of this invention, a multigrid or parallel gate would be suitable substitutes. The cathode-coupled gate 8 employs two triodes 62 and 64, which normally conduct at saturation. In operation, cut-off of either triode 62 or 64 by an input signal from oscillator 4 or multivibrator 10 respectively, does not influence the cathode potential. However, when input signals arrive simultaneously at grids 60 and 66, both triodes are cut off and the operating signal appears across the output 68 of gate 8. It is contemplated that an operating signal of 10 microseconds duration is adequate, but this is dependent upon the requirements of the particular system.

A conventional free-running multivibrator 10 supplies a control signal to grid 66 of triode 64 in gate 8. This multivibrator is essentially a free-running oscillator, providing intermittent output pulses for triggering gate 8. Other multivibrator circuits suitable for this purpose include the One Shot Multivibrator and the Eccles-Jordan Trigger Circuit. The delay time between output pulses from the multivibrator is set by the time constant of resistances 70 and 72 and capacitances 74 and 76. For equal delays between output pulses, the time constant of resistance 70 and capacitance 76 must equal that of resistance 72 and capacitance 74. To improve the frequency stability of multivibrator 10 and to insure that it will be triggered on every $n$th pulse, an A.C. power source 78, supplies a synchronizing sinusoidal voltage as shown. This voltage forces the period to be equal to a multiple or submultiple of the synchronizing frequency.

Transducer 14 utilizes a piezoelectric, X-cut, quartz crystal 16 disposed between plane-parallel electrodes 18 adjoining one pair of the crystal faces. The operating signal from gate 8 is conveyed through conductor 12 and applied to electrodes 18. In response, mechanical vibrations are produced on an alternate pair of crystal faces. These vibrations become very large at the mechanical resonant frequency of the crystal.

A quartz dielectric is preferable because of its inherent stability with time and temperature, which ensures a constant resonant frequency. The high figure of merit (Q) of quartz, 10,000–500,000, accounts for this desirable property. Other suitable dielectrics for this application are crystals of rochelle salts, amomnium tartrate, and barium titanate.

Optimum energy transfer from transducer 14 to probe 20 is achieved by providing a high coupling efficiency therebetween. This is accomplished by matching the crystal and probe impedances through proper selection of their relative sizes and by utilizing a hard material for probe 20, e.g., steel or quartz. In this manner, the amplitude of the crystal vibrations is substantially maintained in probe 20.

The operating signal and reflected pulses are amplified in a high frequency, linear, class A operated pentode amplifier 34, and applied through conductors 80 to the vertical deflection plates 36 of a conventional cathode ray oscilloscope 38 for presentation. Sweep generator 40 simultaneously applies a one megacycle saw tooth voltage through conductors 82 to horizontal deflection plates 46, thereby imparting horizontal travel to the electron beam of oscilloscope 38. A triggered vacuum tube sweep generator is preferred, since it is particularly adaptable to providing a high frequency sweep wave in response to the operating signal.

Although the invention has been described and illustrated in detail, it is to be clearly understood that the same is by way of illustration and example only and is not to be taken by way of limitation, the spirit and scope of this invention being limited only by the terms of the appended claims.

Having described the invention, what is claimed is:
1. A liquid level indicator comprising:

(a) a source of ultrasonic frequency electrical energy,
(b) first means transmuting said electrical energy to corresponding signal mechanical vibrations,
(c) second means intermittently feeding said electrical energy to said first means,
(d) third means cooperating with said first means and having at least one end submersed in a liquid,
(e) said third means conducting said signal vibrations and further conducting respective mechanical vibrations reflected from the surface of the liquid and from said submersed end,
(f) said first means further transmuting said reflected mechanical vibrations to corresponding electrical pulses, and
(g) fourth means comparing the relative positions of said electrical energy and said electrical pulses so that the level of the liquid is determined.

2. A liquid level indicator comprising:
(a) an ultrasonic oscillator generating an alternating voltage signal,
(b) a piezoelectric crystal transmuting said alternating voltage signal to corresponding signal mechanical vibrations,
(c) a gate circuit electrically connected between said oscillator and said crystal,
(d) a multivibrator circuit electrically connected to said gate circuit,
(e) said gate circuit intermittently feeding said voltage signal to said crystal in response to a periodic control signal received from said multivibrator circuit,
(f) an elongated probe having a first end submersed in a liquid and a second end cooperating with said crystal,
(g) said probe conducting said signal vibrations and further conducting respective mechanical vibrations reflected from the surface of the liquid and from said submersed end,
(h) said crystal further transmuting said reflected mechanical vibrations to corresponding electrical pulses, and
(i) an oscilloscope means electrically connected to said crystal so that the relative positions of said corresponding electrical pulses are indicated.

References Cited by the Examiner

UNITED STATES PATENTS

| 2,709,918 | 7/55 | Yetter | 73—290 |
|---|---|---|---|
| 2,998,723 | 9/61 | Smith et al. | 73—290 |
| 3,080,752 | 3/63 | Rich | 73—290 |
| 3,100,994 | 8/63 | Junger | 73—290 |

FOREIGN PATENTS

| 751,156 | 6/56 | Great Britain. |
|---|---|---|
| 829,741 | 3/60 | Great Britain. |

CHESTER L. JUSTUS, *Primary Examiner.*

KATHLEEN CLAFFY, *Examiner.*